United States Patent [19]

Matsunaga

[11] Patent Number: 5,245,698
[45] Date of Patent: Sep. 14, 1993

[54] APPARATUS FOR AND METHOD OF CORRECTING MEMBERSHIP FUNCTIONS

[75] Inventor: Nobutomo Matsunaga, Hirakata, Japan

[73] Assignee: Omron Corporation, Kyoto, Japan

[21] Appl. No.: 745,483

[22] Filed: Aug. 14, 1991

[51] Int. Cl.⁵ ............................................. G06F 15/00
[52] U.S. Cl. ........................................ 395/61; 395/51; 395/900; 364/163
[58] Field of Search .................... 395/61, 3, 51, 900; 364/163

[56] References Cited

U.S. PATENT DOCUMENTS

| | | | |
|---|---|---|---|
| 4,837,725 | 6/1989 | Yamakawa | 395/61 |
| 4,924,165 | 5/1990 | Kohno | 318/592 |
| 5,049,796 | 9/1991 | Seraji | 395/84 |

*Primary Examiner*—Allen R. MacDonald
*Attorney, Agent, or Firm*—Dickstein, Shapiro & Morin

[57] ABSTRACT

An apparatus for and a method of creating membership functions for use with fuzzy inference rules in a controller. A control error, which is a difference between a controlled variable obtained from a control object and a target value, is received as an input to the controller and then a fuzzy reasoning operation is executed in conformity with a predetermined fuzzy reasoning rule such that a manipulated variable resulting from the reasoning operation is supplied to the control object. Thereby achieving a fuzzy control on the control object. Basic membership functions are loaded in a memory. In response to input data which represents a desired characteristic for a predetermined range of a control error in a response characteristic of the control object, the apparatus adjusts the width, height, and/or position of the basic membership functions associated with the predetermined range to produce new membership functions which develop the desired characteristic.

10 Claims, 14 Drawing Sheets

Fig.6
| ė \ e | NM | NS | ZR | PS | PM |
|---|---|---|---|---|---|
| PM | ZR | NM | NB | NB | NB |
| PS | PM | ZR | NM | NB | NB |
| ZR | PB | PM | ZR | NM | NB |
| NS | PB | PB | PM | ZR | NM |
| NM | PB | PB | PB | PM | ZR |
Fig.7a
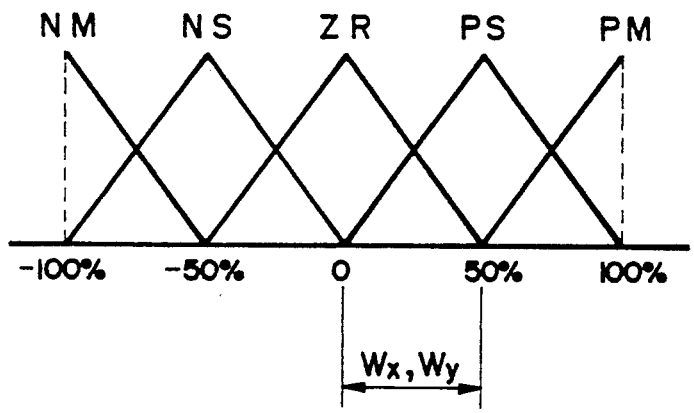
Fig.7b
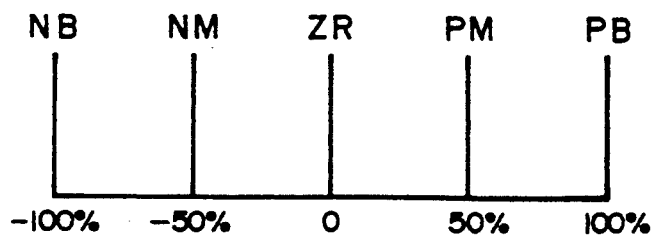

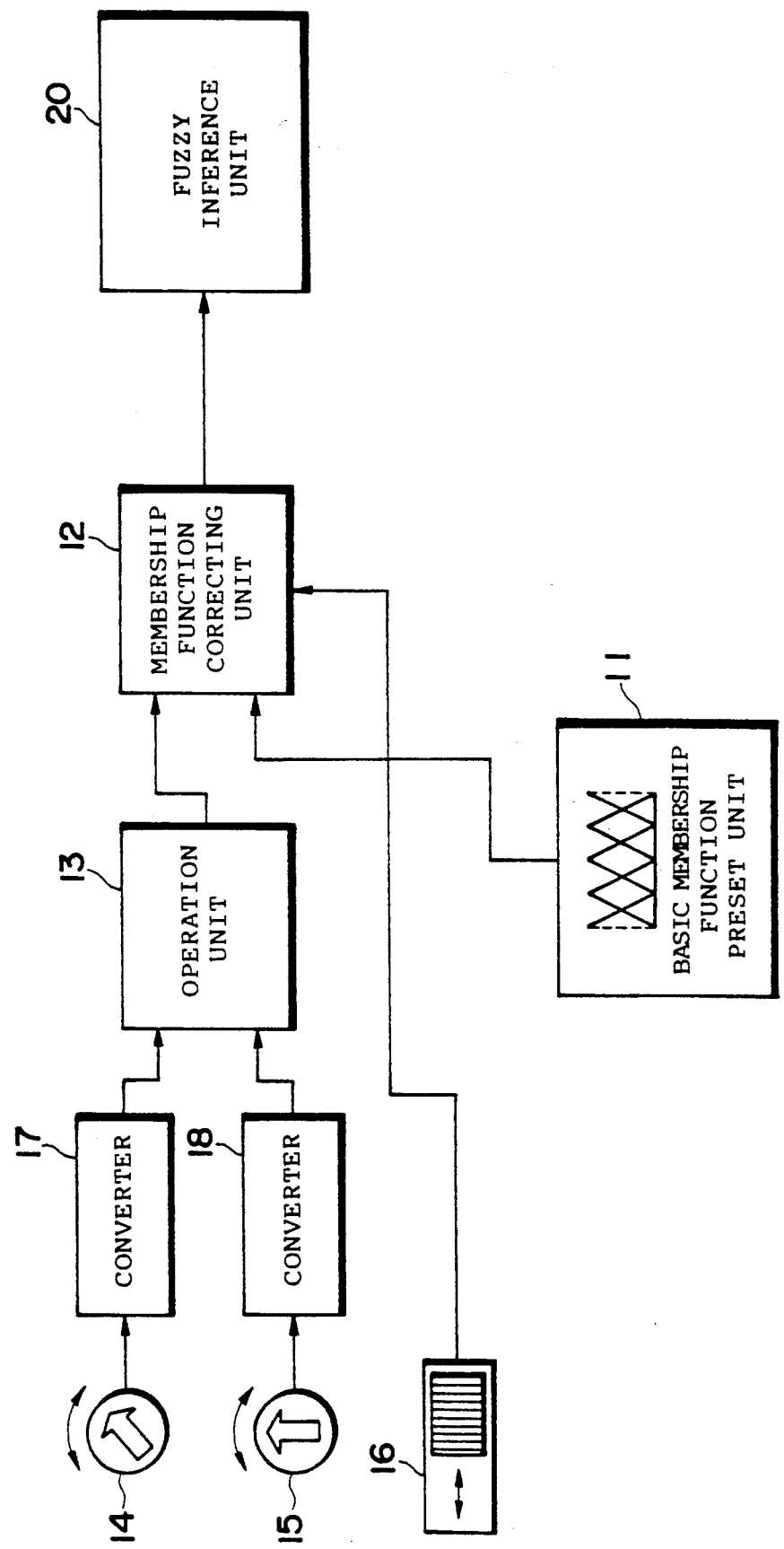

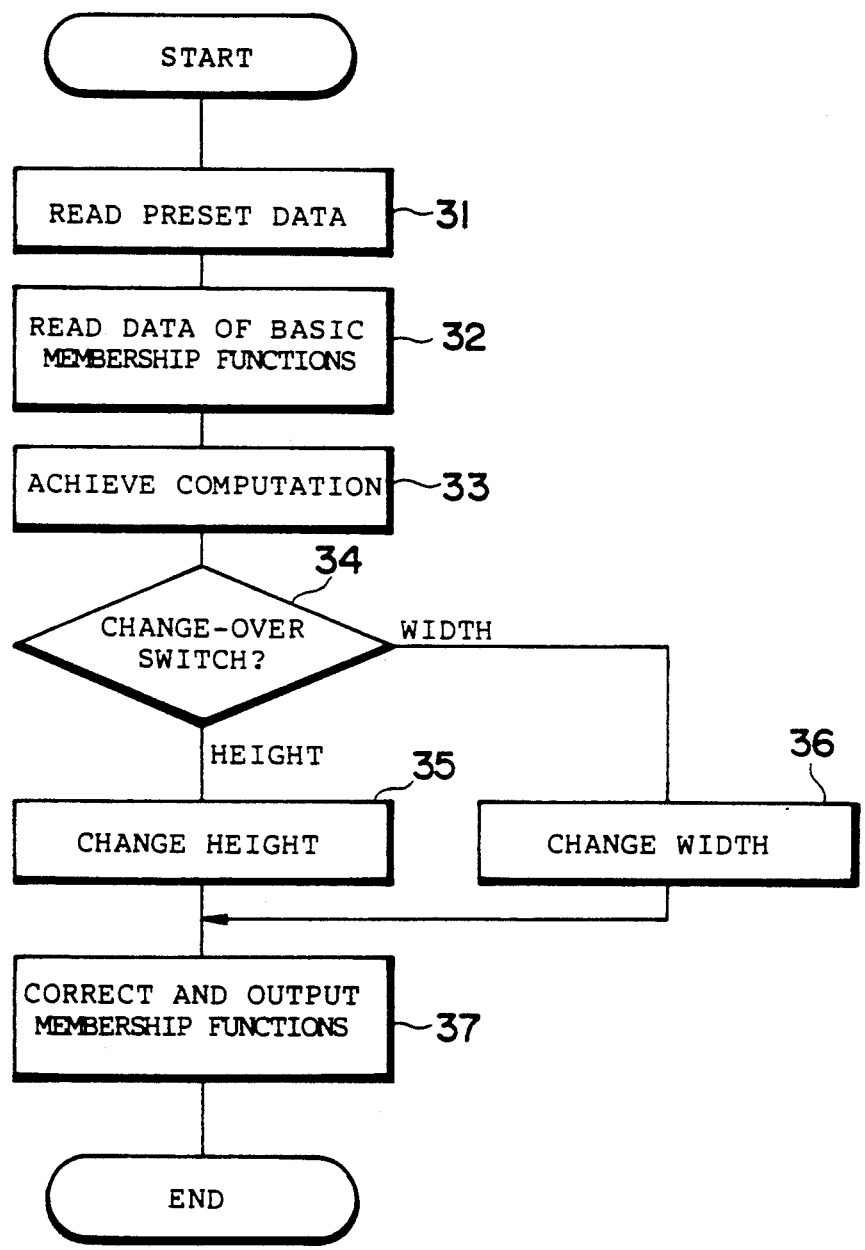

APPARATUS FOR AND METHOD OF CORRECTING MEMBERSHIP FUNCTIONS

BACKGROUND OF THE INVENTION

1. Field of the Invention

The present invention relates to an apparatus and a method of generating membership functions for use in a fuzzy control operation employing predetermined fuzzy inference rules related to the membership functions, wherein a difference between a controlled variable attained from a control object and a target value, i.e. a control difference, is received as an input to conduct a fuzzy inference operation based on a predetermined fuzzy inference rule associated with the membership functions, and a manipulated variable resultantly obtained is supplied to the control object, thereby accomplishing a fuzzy control on the control object.

2. Description of Related Art

In a common practice, a PD (proportion and differentiation) control method has been used in this field. According to the PD control method, a manipulated variable u to be fed to a control object is defined as follows.

$$u = K_p \cdot e + K_v \cdot \dot{e} \quad (1)$$

where,
- $K_p$: Position gain
- $K_v$: Velocity gain
- $e$: Position error
- $\dot{e}$: Velocity error Let us assume here that the control object is represented as a linear lag (first-order lag) system and the target value to be supplied thereto is expressed as r. In this situation, the controlled value outputted as y (response characteristic) from the control object is represented by $$y(s) = [K/(1+Ts)] \cdot r(s) \quad (2)$$

where, s indicates a Laplace's operator or Laplacian.

In a region of time, Expression (2) is reduced to $$y(t) = (1 \ K/T) \cdot [exp(-t/T)] \cdot r(t) \quad (3)$$

where, K stands for a gain constant and T denotes a time constant (to be utilized in the form of $1/T = \alpha$ herebelow).

The position error e and the velocity error $\dot{e}$ is expressed as $$\begin{aligned} e &= r - y \\ &= [1 - \alpha \cdot K \cdot exp(-\alpha t) \cdot r(t) \quad (4) \\ \dot{e} &= K \cdot \alpha^2 \cdot [exp(-\alpha t)] \cdot r(t) \quad (5) \end{aligned}$$

The expressions (4) and (5) indicate that the position error e and the velocity error $\dot{e}$, namely, the response characteristic of the control object can be uniquely determined by the value of the gain constant K and the value of $\alpha$.

In this connection, FIG. 1 shows a response characteristic of a linear lag system. In the control operation, a gradient $\alpha$ (quickness) in the starting phase and an inclination $\omega$ (quickness of convergence) at a position where the output y takes a value in the vicinity (e.g. 80%) of the target value r serve primary roles.

FIG. 2 shows a graph of a phase plane in the PD control. The control operation is carried out such that a locus of a point is drawn from the initial point to follow a straight line of u=0 so as to reach the target point.

As described above and as can been seen from the graph of FIG. 1, the quickness in the starting phase and of the convergence in a linear lag system are determined depending on the values K and $\alpha$. In addition, as shown in FIG. 2, according to the conventional PD control system, since the control operation is accomplished in the overall region of the phase plane based on the expression (1) and $K_p$ and $K_v$ are constant, the behavior of the control object is uniquely decided by the values K and $\alpha$ in the overall region, which disadvantageously leads to a problem of a minimized degree of freedom in the control operation.

When different control operations are desired to be achieved for respective regions according to the conventional PD control method, a plurality of PD control apparatuses are required to be disposed such that a change-over operation is appropriately conducted between these apparatuses depending on a state of the control object. This resultantly complicates the structure of the control apparatuses and hence increases the cost thereof.

On the other hand, a fuzzy control apparatus which has been recently highlighted and which has been increasingly put to practical uses is relatively simple in the configuration thereof and has an advantageous feature of developing arbitrary control characteristics. For example, depending on membership functions and fuzzy inference rules, a discontinuous control and a nonlinear control can be accomplished.

The fuzzy inference or reasoning rules represent knowledge, experiences, and know-how of experts of an objective control field and hence can be determined in a relatively easy manner.

However, in many cases, the contours and positions of the membership functions utilized in association with the fuzzy inference rules cannot be extracted from the knowledge of the experts. Moreover, there has not been defintely established a method of determining the membership functions. Heretofore, consequently, these functions are required to be obtained through a trial-and-error procedure.

FIG. 3 shows a membership function having a quite simple form i.e. a triangular shape. Also for a membership function having such a simple contour, it is necessary to determine a width ($W_L$ and $W_R$ and $W_L + W_R$), a height (H), and a center position (distance L from the origin O). A membership function needs be defined for each of the input/output variables and for each linguistic information or label (to be simply referred to as a label herebelow) related to each of the variables. In consequence, the total number of the membership functions is represented by a value which is attained by multiplying the number of the kinds of input and output variables by the number of the kinds of labels. For example, let us assume that the number of the labels and the number of the kinds of input variables are five and two, respectively. Under this condition, for the input variables (the antecedents of rules), ten (5×2) kinds of membership functions are required to be established.

FIG. 4a shows an example of typical membership functions. Each function is drawn in the form of an isosceles triangle of which a vertex has a grade of one. In this graph, adjacent triangles intersect each other at positions where the grade value is 0.5.

This graph includes five kinds of labels (or linguistic information) as follows.

PM: Positive Medium.
PS: Positive Small.
ZR: Almost Zero.
NS: Negative Small.
NM: Negative Medium.

In addition to the labels above, for example, the following labels may also be employed in relation to the membership functions, which will be described later.

PB: Positive Big.
NB: Negative Big.

FIG. 4b shows another example of membership functions each having a triangular shape.

Let us assume in this specification that for a triangle constituted with three points and three edges or sides therebetween, a point having a grade other than zero is called a vertex and each of two other points having a grade equal to zero is called an end point. Moreover, an edge between the vertex and an end point and an edge between the end points are to be called a hypotenuse or an oblique side and a base, respectively.

In the graph of FIG. 4b, all membership functions excepting one associated with the label ZR, namely, four membership functions respectively denoted with the labels PM, PS, NS, and NM each have an end point located at a center position.

In the cases respectively utilizing the membership functions of FIGS. 4a and 4b, even when the fuzzy control is accomplished depending on the same fuzzy rules, the behavior resulting from the control operation varies between the control objects respectively associated with the cases. Namely, the kinds and the contours of the membership functions may be arbitrarily changed and/or modified in various manners; moreover, the response characteristic of the control object alters depending on the kinds and the shapes of the membership functions. In consequence, it takes a considerably large amount of labor and a long period of time for the user to set and/or to adjust the membership functions in order to establish a desired control.

SUMMARY OF THE INVENTION

It is therefore an object of the present invention to provide an apparatus for and a method of automatically generating membership function which enables a desired response characteristic of a control object to be attained in a desired region of the response characteristic.

There is provided, according to the present invention, an apparatus for creating membership functions for use with fuzzy inference rules in a fuzzy inference system wherein a value related to a controlled variable obtained from a control object is received as an input and then a fuzzy inference operation is executed in conformity with a predetermined fuzzy inference rule such that a manipulated variable resulting from the inference operation is supplied to the control object. Thereby achieving a fuzzy control on the control object.

The membership function generating apparatus includes membership function preset means for setting therein basic membership functions, data input means for inputting therefrom data representing a desired characteristic for a predetermined range of a value related to a controlled variable in a response characteristic of a control object, and membership function correcting means responsive to input data for accessing the basic membership functions to select those associated with the predetermined range and for correcting the selected membership functions so as to develop the desired characteristic.

According to the present invention, there is also provided a method of generating membership functions for use with fuzzy inference rules in a fuzzy inference system wherein a value related to a controlled variable attained from a control object is received as an input thereto and then a fuzzy inference operation is executed in conformity with a preset fuzzy inference rule such that a manipulated variable resultant from the inference operation is fed to the control object, thereby achieving a fuzzy control on the control object.

The membership function generating method comprises the steps of setting basic membership functions, receiving an input of data which represents a desired characteristic for a predetermined range of a value related to a controlled variable in a response characteristic of a control object, and accessing in response to input data the basic membership functions to select those associated with the predetermined range and correcting the selected membership function so as to develop the desired characteristic.

The value related to the controlled variable is, for example, a control error. For example, a position error and a velocity error may be used as control errors.

In a mode of carrying out the present invention, relationships between a position gain and a velocity gain in a PD control, and a width of a membership function related to a position error and a width of a membership function related to a velocity error are employed to correct a width of the selected basic membership function.

In another mode of carrying out the present invention, the height or the position is corrected for particular ones of the basic membership functions.

The data representing the basic membership functions will be stored, for example, in a memory.

In accordance with the present invention, there are automatically prepared membership functions which enable a desired response characteristic to be obtained in a desired region of the response characteristic of the control object. In consequence, using a fuzzy control unit, there can be developed a control operation to attain a desired characteristic in a desired region of a control error (a position error and/or a velocity error). This accordingly makes unnecessary the change-over operation which has been required between a plurality of control units in the prior art. Thereby simplifying the configuration of the control unit. Moreover, an appropriate control operation can be accomplished depending on a characteristic of the control object.

The foregoing and other objects, advantages, manner of operation, and novel features of the present invention will be understood from the following detailed description when read in connection with the accompanying drawings.

BRIEF DESCRIPTION OF THE DRAWINGS

FIG. 6 is a table useful to explain fuzzy inference rules;

FIGS. 7a and 7b are diagrams showing examples of membership functions related to antecedents and consequents of fuzzy rules, respectively;

FIG. 10 is a block diagram showing the constitution of a membership function generating unit;

FIG. 11 is a flowchart showing an operation procedure of a membership function generation;

FIG. 15b is a graph showing a phase plane related to FIG. 15a;

FIG. 15c is a graph showing membership functions associated with FIG. 15a;

FIG. 16b is a graph showing a phase plane related to FIG. 16a;

FIG. 16c is a graph showing membership functions associated with FIG. 16a;

FIG. 17b is a graph showing a phase plane related to FIG. 17a; and

FIG. 17c is a graph showing membership functions associated with FIG. 17a.

DESCRIPTION OF THE PREFERRED EMBODIMENTS

Figure 5:
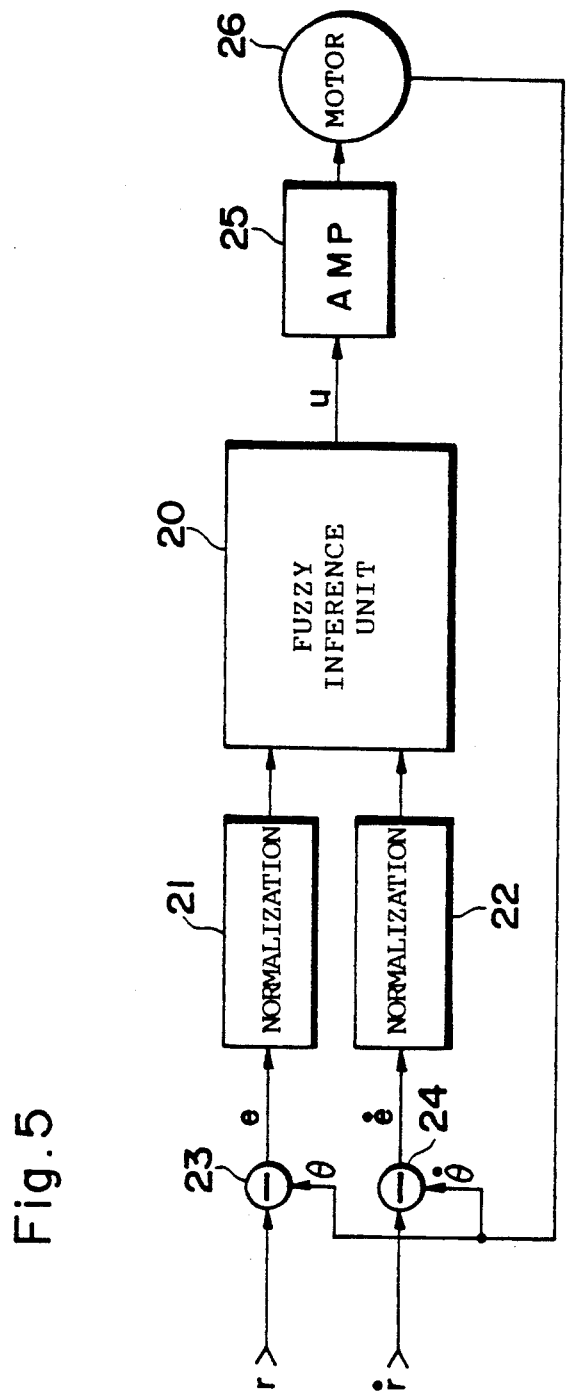
FIG. 5 is a block diagram schematically showing the configuration of a control system.

FIG. 5 shows a control system of a servomotor including a fuzzy control unit. Although a servomotor is a control object of a quadratic (second order) lag system, the behavior thereof is substantially associated with the linear lag system; consequently, the description above also applies to this case.

First, a target value r of an angle and a target value $\dot{r}$ of an angular velocity are supplied to the control system. Subtractors 23 and 24 disposed in the system respectively compute a difference (a position error) a between an angle $\theta$ (corresponds to the controlled variabel y above) measured in the servomotor 26 and the target value r thereof and a discrepancy (a velocity error) $\dot{e}$ between an angular velocity $\dot{\theta}$ also obtained from the servomotor 26 and a target value $\dot{r}$ thereof. These errors e and $\dot{e}$ are respectively normalized by normalizer circuits 21 and 22 so as to take values respectively within the overall value range of the input variables to be processed in the fuzzy inference unit 20. Receiving the normalized position and velocity errors e and $\dot{e}$ as inputs thereto, the fuzzy inference unit 20 achieves a reasoning operation based on fuzzy inference rules, which will be described later, thereby finally producing a manipulated (voltage or current) variable u in a defuzzified form. The resultant variable u is amplified by an amplifier 25 so as to be used to drive the servomotor 26.

The fuzzy reasoning unit 20 may be implemented as an apparatus having an architecture (of an analog type or a digital type) dedicated to the fuzzy reasoning operation or by use of a binary computer programmed to execute the fuzzy reasoning operation.

FIG. 6 is a table showing an example of fuzzy inference rules to be processed by the fuzzy inference unit 20. The upper-most row includes labels assigned to membership functions related to the position error e, whereas the left-most column denotes labels for membership functions associated with the velocity error $\dot{e}$. These labels are employed in antecedents of fuzzy rules. A matrix constituted with five rows and five columns in the remaining portion of the table of FIG. 6 includes symbols designating labels of membership functions for the manipulated variable u, which are used to express consequents of fuzzy rules. In consequence, this table comprises 25 fuzzy inference rules. For example, for labels e=NM and $\dot{e}$=PM, there is attained a fuzzy rule as follows.

If $e=NM$ and $\dot{e}=PM$, then $u=ZR$

FIG. 7a shows membership functions commonly adopted for the position and velocity errors e and $\dot{e}$ in the fuzzy rule above. In this graph, each of the membership functions is drawn in the form of a triangle.

Let us assume here that the membership functions respectively associated with the position and velocity errors e and $\dot{e}$ have widths $W_x$ and $W_y$, respectively. The width of a membership function having a triangular shape is denoted by a length which is half that of a base of the triangle. In general, the width of a membership function is represented by a length equal to half that associated with a domain represented by a support or a universe of discourse of the membership function.

The graph of FIG. 7b shows membership functions of the manipulated variable u to be used in the fuzzy rule above. Each of the membership functions for the consequents is expressed here in the form of a singleton.

Subsequently, the fuzzy control system of FIG. 5 will be compared with the PD control system described above.

Figure 2:
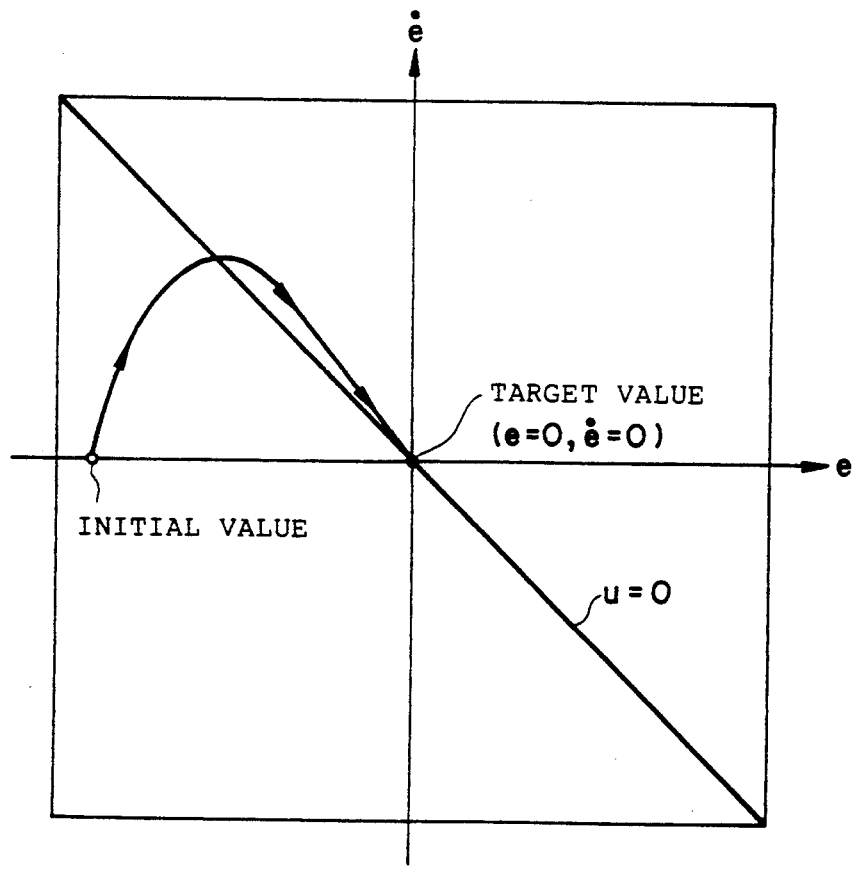
FIG. 2 is a diagram schematically showing a phase plane.
Figure 3:
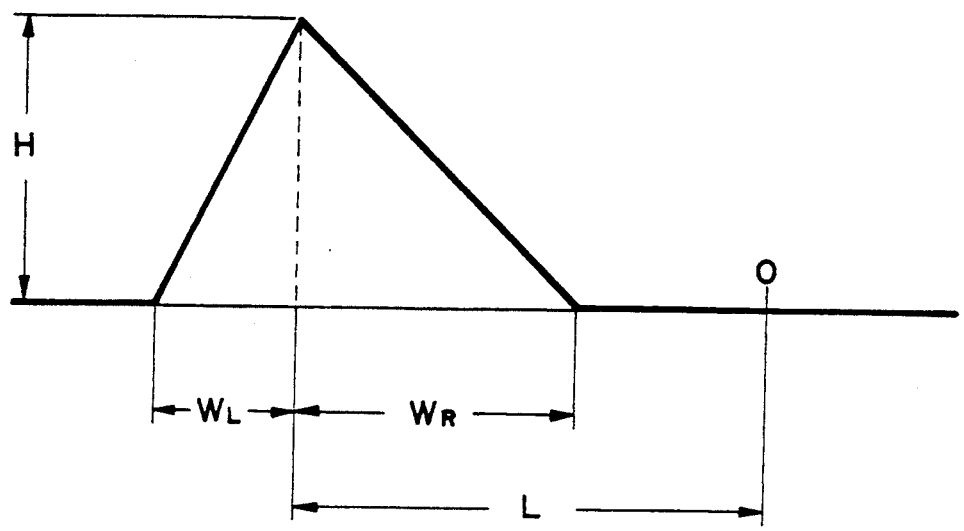
FIG. 3 is a diagram showing an example of membership functions.
Figure 4A:
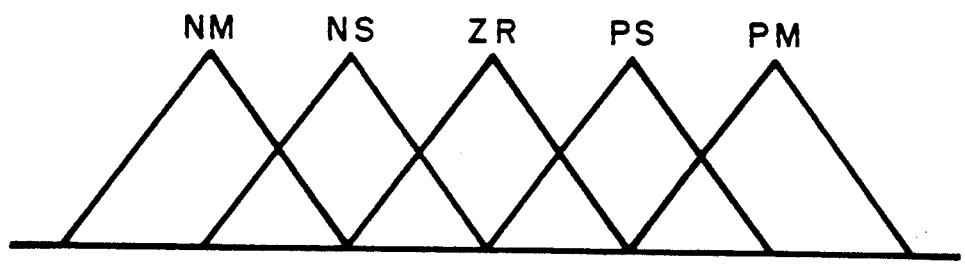
FIGS. 4a and 4b are diagrams showing examples of groups of membership functions, respectively.
Figure 4B:
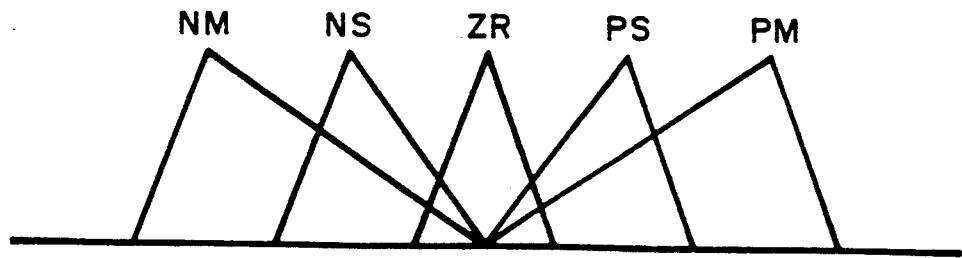
Figure 8:
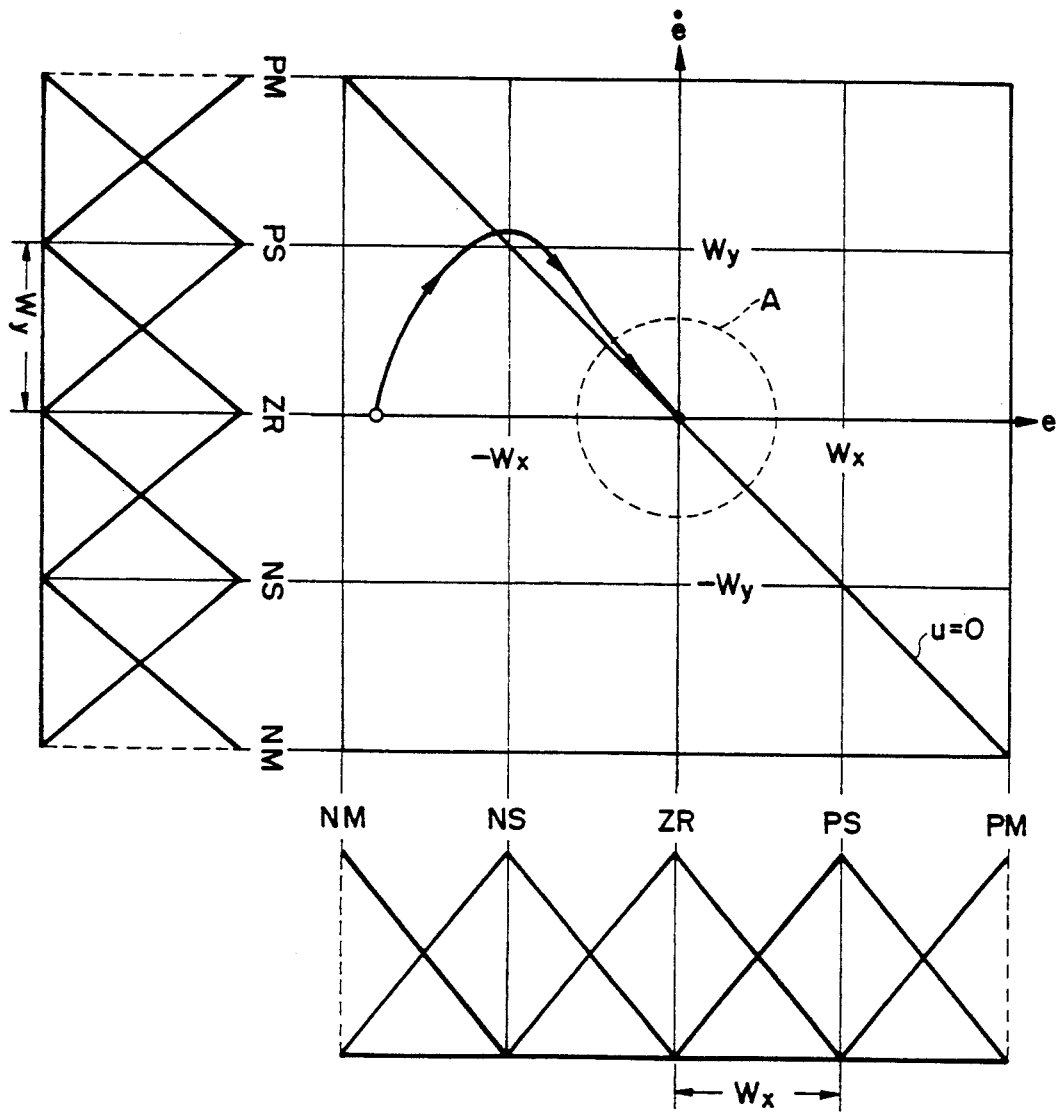
FIG. 8 is a graph illustratively showing a phase plane and membership functions preset for a subdivision of the phase plane.

FIG. 8 shows a graph including a phase plane identical to that of the PD control system of FIG. 2. Membership functions related to the position error e and the velocity error $\dot{e}$ are respectively established along an axis of the phase error e and an axis of the velocity error $\dot{e}$ on the phase plane. As a result, the phase plane is subdivided according to regions of these membership functions. In this example, the adjacent membership functions intersect each other at a point where the grade takes a value of 0.5.

The controlled variables ($\theta$ and $\dot{\theta}$) respectively converge onto the target values (r and $\dot{r}$) within a range denoted by a dotted-line circle A and in the proximity thereof. In consequence, the range denoted by the dotted-line circle A and the proximity thereof are areas contributing to the convergence of the control variables onto the respective target values. In these domains, for the position and velocity errors e and $\dot{e}$, the membership function assigned with the label ZR develops a dominant influence.

Figure 9:
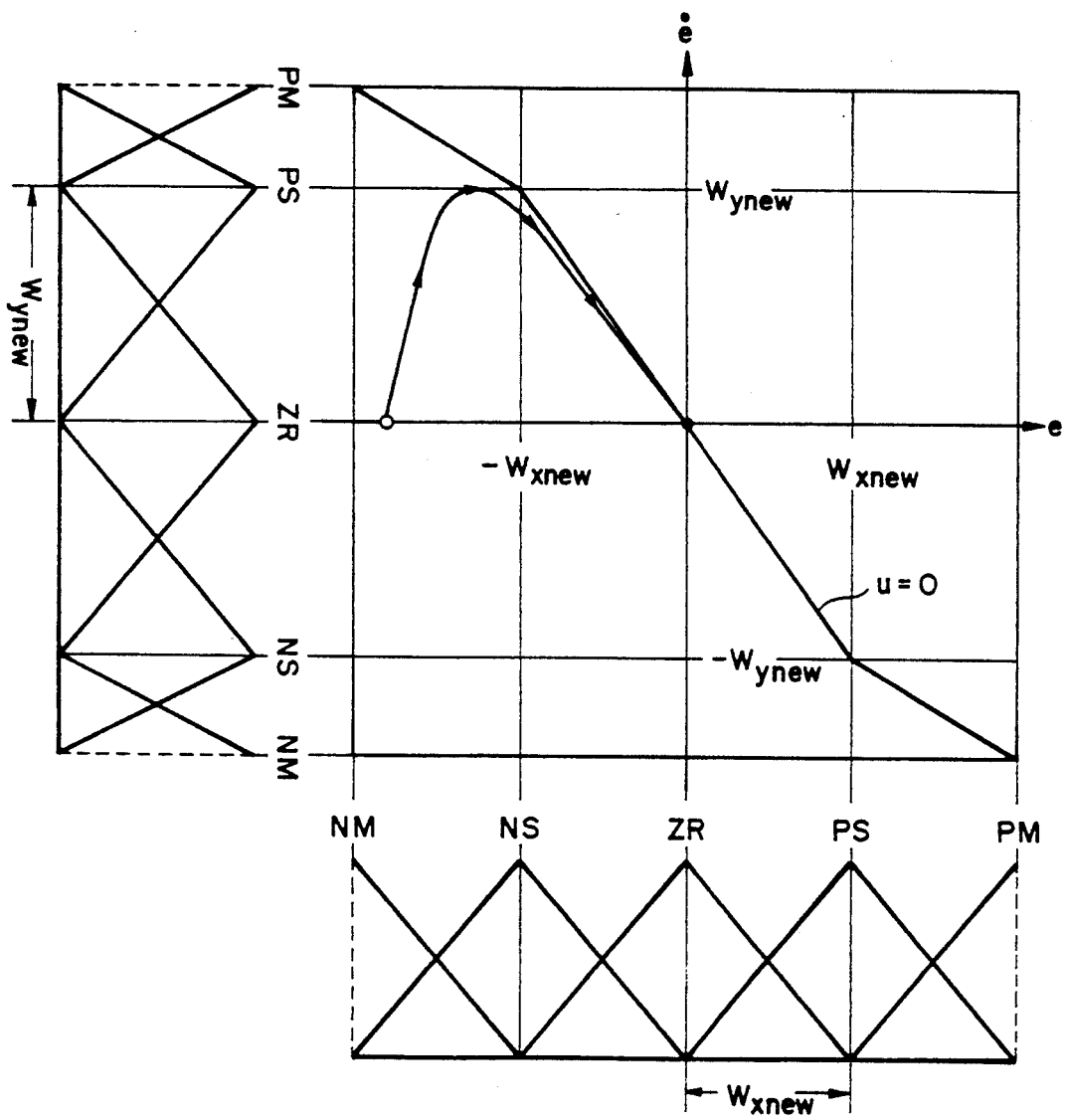
FIG. 9 is a graph showing another case of the subdivision of the phase plane in which the subdivision is effected in a region different from that of FIG. 8.

As shown in FIG. 9, let us assume that the width $W_y$ of the membership function ZR related to the velocity error $\dot{e}$ is increased to a new width $W_{ynew}$. In accordance with the change in the width of the membership function ZR, the other membership functions PM, PS, NS, and NM are also varied in the widths thereof under a condition that the adjacent membership functions intersect each other at a position where the grate takes a value of 0.5. Namely, when the width of the membership function ZR related to the velocity error $\dot{e}$ is increased in the neighborhood of the target value, the convergence velocity onto the target value becomes greater.

In FIG. 9, although the membership function for the position error e is not subjected to the change in the width, the similar operation may also be executed to vary the width of the membership function related to the position error e.

Conversely, when the widths of the membership functions in the periphery of the phase plane, such as these designated by labels PM, NM and so on, are expanded, the rising or starting characteristic becomes steeper or improved.

As above, under the condition that the adjacent membership functions intersect each other at a point where the grade is 0.5, when either one of the membership functions is changed in the width thereof, the widths of the other membership functions are determined in a unique manner. It may also be possible to remove the condition above such that the widths of the respective membership functions are altered independently of each other.

In the PD control, as described above, the response characteristic in the overall region of the phase plane is decided depending on the expressions (1), (4), and (5) and hence can be uniquely determined by the values of K and $\alpha$.

As contrast thereto, in the fuzzy control, the width of each membership function can be changed with respect to each region thereof, which enables the rising and converging characteristics to be separately established. This is a quite advantageous feature of the fuzzy control.

Expression (1) is reduced as follows through a substituted of u=0.

$$\dot{e} = -\frac{K_p}{K_v} e \qquad (6)$$

On the other hand, in the graph of FIG. 8, the following relationship holds.

$$\dot{e} = -\frac{W_y}{W_x} e \qquad (7)$$

From expressions (6) and (7), it can be seen that the following condition is satisfied between the gains $K_p$ and $K_v$ in the PD control and the widths $W_x$ and $W_y$ of the membership functions in the fuzzy control.

$$\frac{K_p}{K_v} = M \frac{W_y}{W_x} \qquad (8)$$

More strictly, expression (8) holds on a straight line u=0 and in ranges $-W_x < e < W_x$ and $W_y < \dot{e} < W_y$. However, also in the vicinity thereof, expression (8) is substantially satisfied, namely, equal signs (=) need only be replaced with nearly equal signs ($\approx$). Moreover, also on a polygonal line u=0 as shown in FIG. 9, expression (8) may possibly be considered to hold.

Let us assume that the basic membership functions of FIG. 8 are beforehand established and expression (8) is to be represented as follows.

$$A1 = M1 \frac{W_y}{W_x} \qquad (9)$$

In a case where the basic membership functions are adopted to produce new membership functions, expression (8) is modified to $$A2 = M2 \frac{W_{ynew}}{W_{xnew}} \qquad (10)$$

Based on expressions (9) and (10), the following expression is attained.

$$\frac{W_{ynew}}{W_{xnew}} = M \frac{A2}{M2} \cdot \frac{M1}{A1} \cdot \frac{W_y}{W_x} \qquad (11)$$

In general, the membership functions are adjusted to obtain $K_p/K_v = W_y/W_x$. Consequently, assuming M1 to be equal to M2, expression (11) is reduced to $$\frac{W_{ynew}}{W_{xnew}} = \frac{A2}{A1} \cdot \frac{W_y}{W_x} \qquad (12)$$

For example, for A1=50 and A2=25, expression (12) is transformed as follows.

$$\frac{W_{ynew}}{W_{xnew}} = 2 \cdot \frac{W_y}{W_x} \qquad (13)$$

That is, expression (12) or (13) decides a ratio $W_{ynew}/W_{xnew}$ between the widths of new membership functions to be generated.

Based on expression (12) or (13), the user can specify the parameter A2 (and the parameter A1 if necessary) to prepare a membership function developing a desired response characteristic. In place of the parameter A2, the parameter $K_p$, $K_v$, $W_{ynew}$, or $W_{xnew}$ may be designated for the purpose above. Moreover, the system may be configured so that the gain K and the height of a membership function are specified as parameters.

The description above has been given of an operation in which a membership function is generated (or modified) in a domain where the membership function ZR is dominant, namely, for the membership function concerning the convergence to the target values. In a similar manner, for other membership functions having a considerable influence on the rising phase of the response characteristic such as the membership functions PM and NM, the shapes thereof may be determined to attain desired characteristics, respectively. In this case, employing the condition that the adjacent membership functions intersect each other at a position where the grade is 0.5, when the membership functions PM, NM, etc. are thus decided, the other membership functions ZR and the like exisiting in the proximity of the center are determined in an automatic fashion. If the condition above is removed, the membership function ZR contributing to the convergence characteristic and the membership functions contributing to the rising characteristic can be determined independently of each other.

FIG. 10 shows a configuration example of a membership function generator unit operating as described above.

The generator includes two volume controls 14 and 15 and a change-over switch 16 employed as input means. Each of the controls 14 and 15 is constituted with a variable resistor and a rotary regulator knob to be rotated for a regulation of a voltage, which is developed in association with a position indicated by the rotary regulator knob. The controls 14 and 15 produce output voltages to be converted respectively by converters 17 and 18 into signals suitable for an operation of an operation unit 13 for a membership function correcting or modifying unit 12). The resultant signals are fed to the operation unit 13 (or directly to the membership function modifying unit 12).

The membership function generating unit is implemented, for example, by a computer. In such as case, the operation unit 13 and the membership function correcting unit 12 are realized as portion of the computer appropriately programmed. Moreover, analog-to-digital converters are adopted for the converters 17 and 18.

Figure 1:
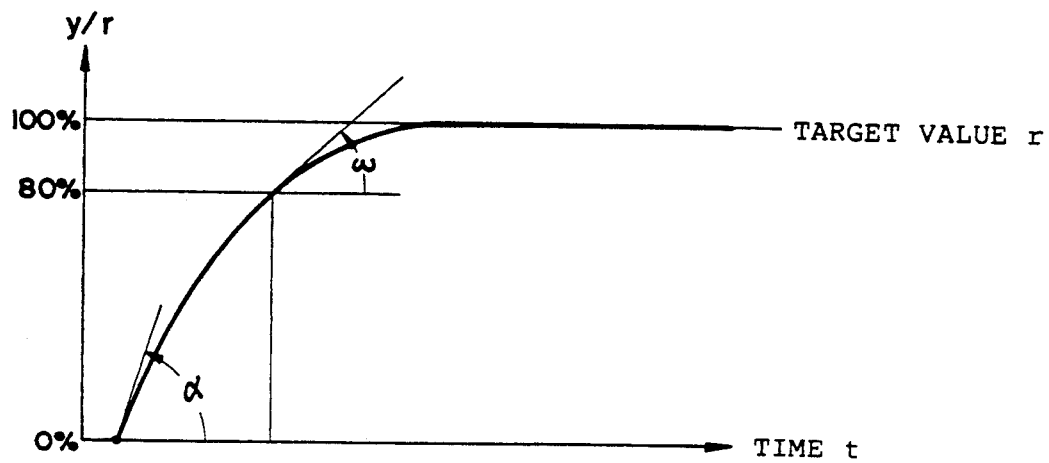
FIG. 1 is a graph illustratively showing a response characteristic of a control object.

The volume controls 14 and 15 may be used to input, for example, a rising inclination angle $\alpha$ related to the rising characteristic and a convergence angle $\omega$ (FIG. 1) associated with the convergence characteristic. Furthermore, the ratio A2 and the widths $W_{ynew}$ and $W_{xnew}$ may be supplied from the controls 14 and 15 directly to the system. In addition, the user may input from the controls 14 and 15 data (information) denoting a degree indicating a steep or a flat rising gradient or a rapid or slow convergence. In either cases, the controls 14 and 15 are utilized to input data related to the rising characteristic and data associated with the convergence characteristic, respectively.

The change-over switch 16 is disposed to modify a width or a height of a basic membership function, and a selection signal therefrom is delivered to the membership function correcting unit 12.

A basic membership function preset unit 11 is disposed to store therein such basic membership functions PM, PS, ZR, NS, and NM as shown in the graph of FIG. 8. These membership functions may be commonly utilized for the position and velocity errors e and ė. The basic membership function preset unit 11 may be configured, for example, with a memory. When the basic membership functions each have a triangle contour, all data items need not be established to represent the contours thereof. Namely, the unit 11 need only be loaded with the minimum data (e.g. data of coordinates denoting a vertex and end points) necessary for specifying a triangle. This is also the case of membership functions each having another shape (e.g. a form of a normal distribution).

The operation unit 13 is used to receive data from the volume controls 14 and 15 so as to convert the data into signals (of data denoting the widths $W_{ynew}$ and $W_{xnew}$ or the height, for example) necessary for the correction of the basic membership functions. For example, when angles $\alpha$ and $\omega$ are received, the arithmetic unit 13 achieves a computation to obtain the gains $K_p$ and $K_v$ and then produces widths of the membership functions based on the relationship represented by expression (8). On the other hand, on receiving data designating degrees respectively of the rising and converging characteristics, the operating unit 13 executes a computation to create widths or a height associated therewith. Moreover, in a case where the ratio A2 or the widths $W_{ynew}$ and $W_{xnew}$ are directly supplied to the system, the operation unit 13 may possibly be omitted. The controls 14 and 15 may deliver data representing a height of a membership function to the apparatus. In this situation, the operation unit 13 need not be disposed or the configuration thereof will be modified to achieve a simple computation.

The membership function correcting unit 12 is employed to receive data from the operation unit 13 or directly from the controls 14 and 15 so as to modify data representing basic membership functions stored in the basic membership function preset unit 11 based on the received data. With the change-over switch 16 set to a position for selecting a width or a height, the membership function correcting unit 12 modifies the width or the height of the basic membership functions, respectively.

FIG. 11 shows an overall processing procedure adopted in the membership function generating unit.

First, data prepared by the controls 14 and 15 and a selection signal of the change-over switch 16 are fed to the operation unit 13 (step 31). Subsequently, data of the basic membership functions loaded in the preset unit 11 are delivered to the membership function correcting unit 12 (step 32). Concurrently, the operation unit 13 achieves operations required to create data representing the new widths $W_{ynew}$ and $W_{xnew}$ or the height (step 33).

With the change-over switch 16 set to a position requesting a correction of the height or the width, the system accomplishes a modification of the height or the width of the basic membership function, respectively (steps 34, 35, and 36). The data representing the modified basic membership functions are then supplied to the fuzzy reasoning unit 20 (step 37).

FIGS. 12a to 12a, 13a to 13d, and 14a to 14d respectively show membership functions undergone with the width modification and response characteristics developed as a result of fuzzy control operations executed depending on the membership functions.

Figure 12A:
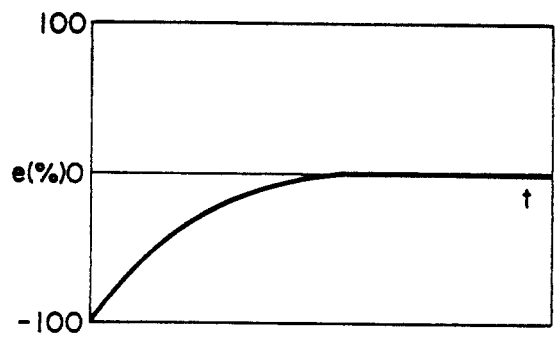
FIGS. 12a and 12b are graphs showing an example of response characteristics associated position and velocity errors, respectively.
Figure 12C:
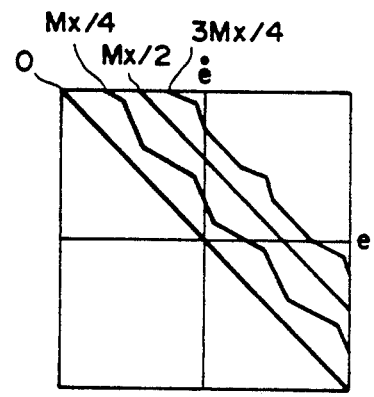
FIG. 12c is a graph showing a phase plane related to FIGS. 12a and 12b.
Figure 12B:
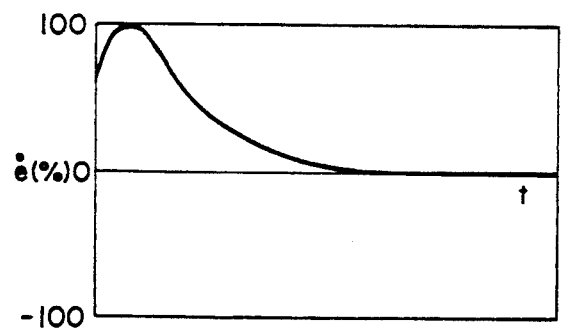
Figure 12D:
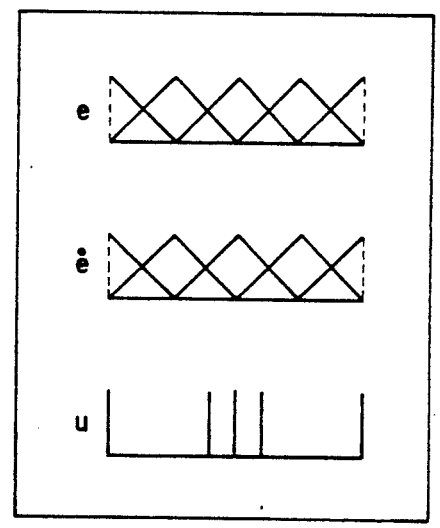
FIG. 12d is a graph showing membership functions related to FIGS. 12a and 12b.

In the graphs of FIGS. 12a to 12d, as representatively shown in FIG. 12d, the positions of the membership functions (each in the form of a singleton) associated with the manipulated variable u of the consequent are shift toward the center point (u=0). However, the membership functions respectively related to the position error e and the velocity error ė are not modified, namely, the contours of the basic membership functions are kept unchanged.

FIG. 12c shows a phase plane including control contour lines representing u=0u=Mx/4, u=MX/2, and u=3Mx/4 in which Mx stands for the maximum value of the manipulated variable u. This is also the case of the graphs shown in FIGS. 13c, 14c, 15b, 16b, and 17b.

FIGS. 12a and 12b show response waveforms related to the position and velocity errors e and ė, respectively. As can be seen from these graphs, when the position and velocity errors e and ė are increased, the response values thereof become gentler.

Figure 13A:
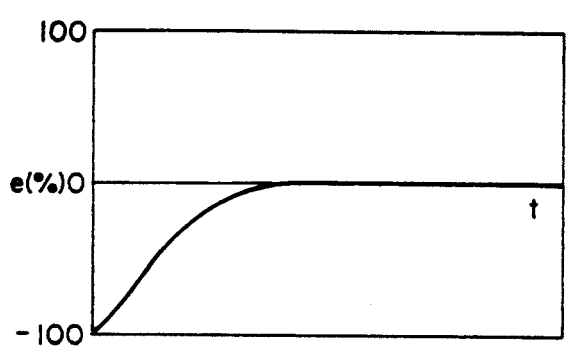
FIGS. 13a and 13b are graphs showing another example of response characteristics associated with position and velocity errors, respectively.
Figure 13B:
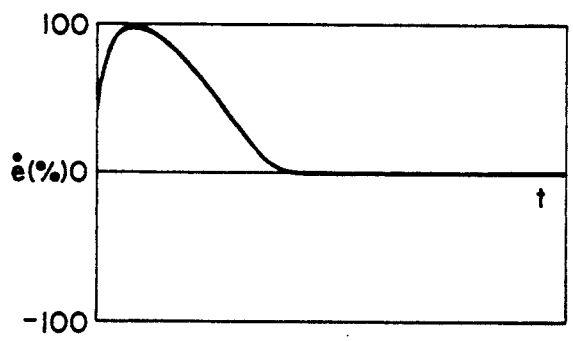
Figure 13C:
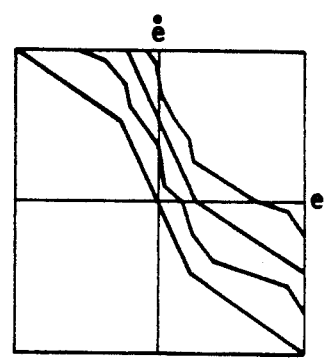
FIG. 13c is a graph showing a phase plane related to FIGS. 13a and 13b.
Figure 13D:
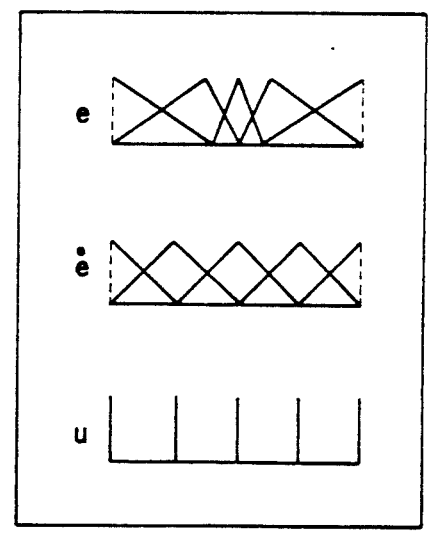
FIG. 13d is a graph showing membership functions related to FIGS. 13a and 13b.

Referring now to the graphs of FIGS. 13a to 13d, the membership functions related to the position error e are modified to be generally shifted toward the neighborhood of a point of e=0 as shown in FIG. 13d. As a result, even for a smaller value of the position error e, the manipulated variable u to be thus produced takes a relatively large value and hence a high control sensitivity is attained in the vicinity of the target value.

Figure 14A:
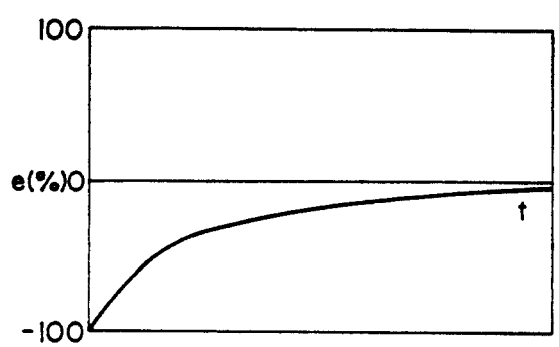
FIGS. 14a and 14b are graphs showing still another example of response characteristics associated with position and velocity errors, respectively.
Figure 14C:
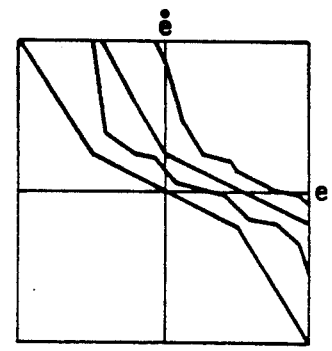
FIG. 14c is a graph showing a phase plane related to FIGS. 14a and 14b.
Figure 14B:
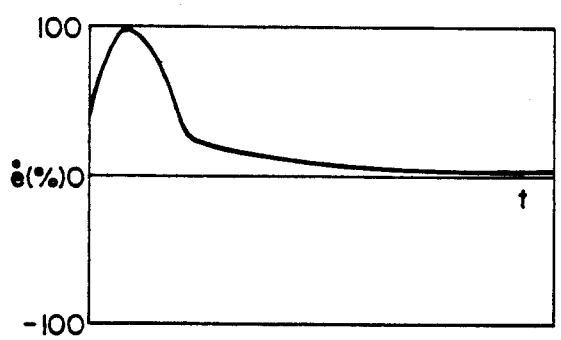
Figure 14D:
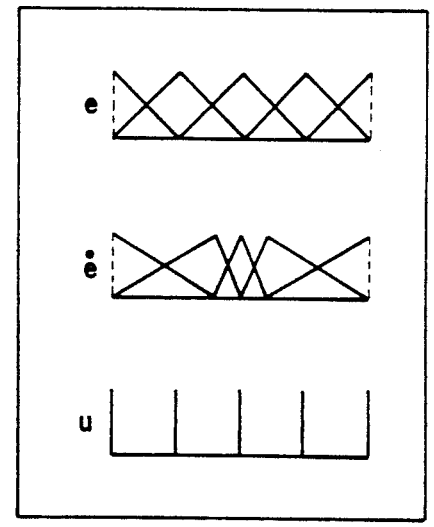
FIG. 14d is a graph showing membership functions related to FIGS. 14a and 14b.

In the graphs of FIGS. 14a to 14d, the membership functions related to the velocity error ė are modified such that the contours thereof are generally shifted toward the vicinity of a point of ė=0 as shown in FIG. 14d. Although the rising gradient of the velocity error ė becomes steep, the convergence characteristic is deteriorated. This result is opposite to that attained in the operation described in conjunction with the graph shown in FIG. 9.

FIGS. 15a to 15c, 16a to 16c, and 17a to 17c are diagrams showing contours of membership functions for which the height (of the membership functions having the label ZR) is changed, positions of the regulator knob of the volume control 14 or 15, and phase planes associated with the membership functions.

Figure 15A:
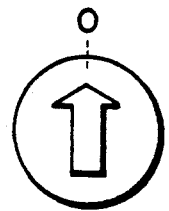
FIG. 15a is a diagram schematically showing an example of a preset control position of a volume control.
Figure 15B:
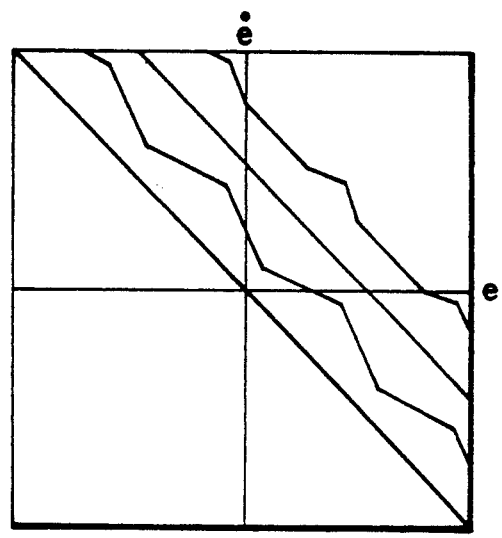
Figure 15C:
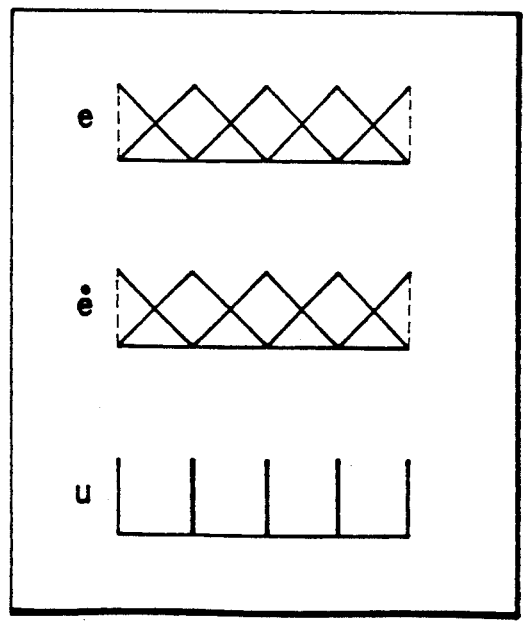

FIGS. 15a to 15c show a case wheree the fuzzy control is achieved without modifying the membership functions, namely, the basic membership functions are adopted to conduct the control operation.

Figure 16A:
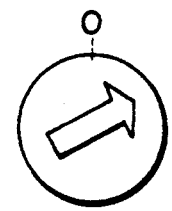
FIG. 16a is a diagram schematically showing another example of a preset control position of a volume control.
Figure 16B:
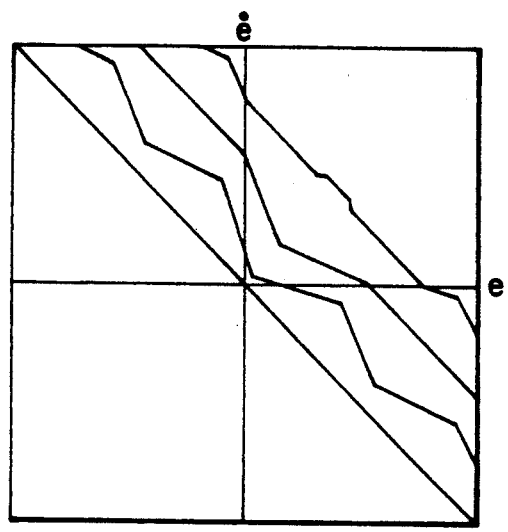
Figure 16C:
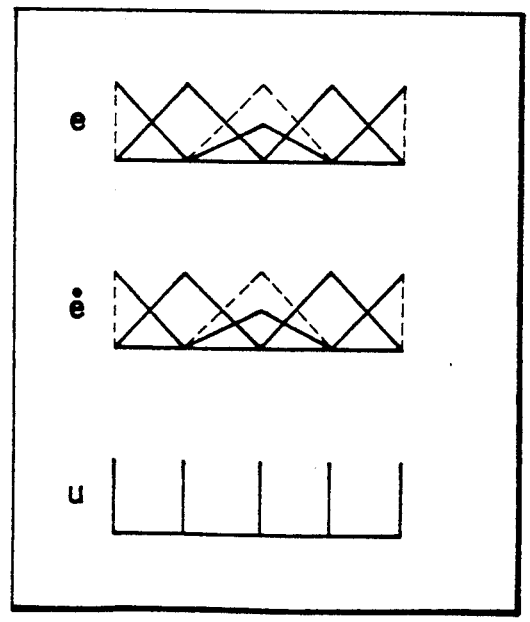

In FIGS. 16a to 16c, the membership functions associated with the position and velocity errors e and ė are checked so as to select therefrom those having the label ZR, thereby lowering the heights thereof. Since the influence of the membership functions ZR is reduced, the manipulated variable produced in the proximity of the target value is relatively increased.

Figure 17A:
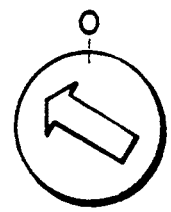
FIG. 17a is a diagram schematically showing further another example of a preset control position of a volume control.
Figure 17B:
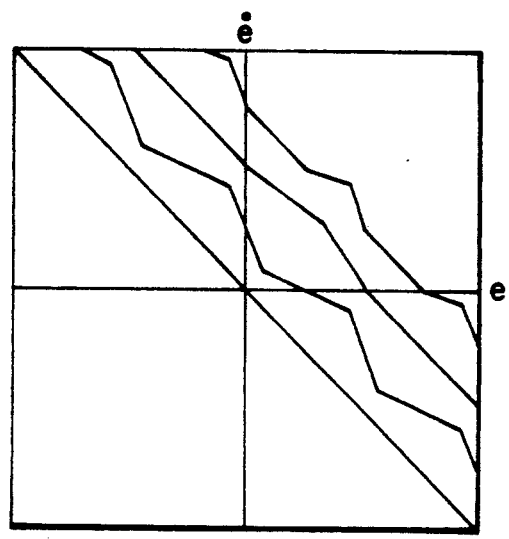
Figure 17C:
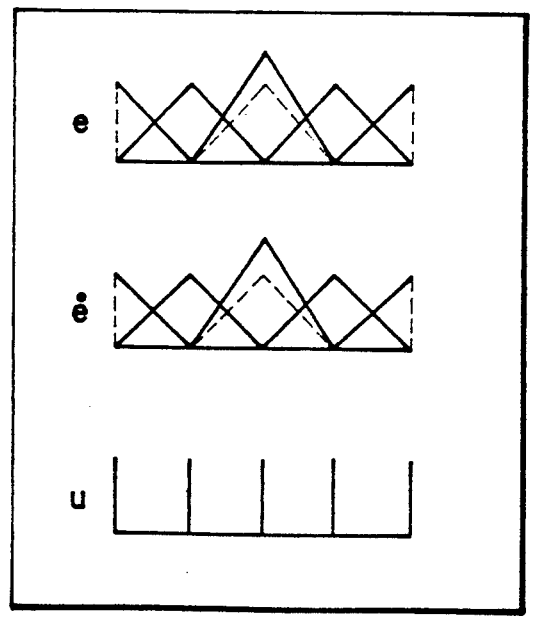

FIGS. 17a to 17c shows a case where the system selected from the membership functions associated with the position andd velocity errors e and ė those having the label ZR so as to relatively increase the heights thereof. Resultantly, the influence of the membership functions ZR is increased and hence the manipulated variable produced in the proximity of the target value is relatively decreased.

As above, when the controls 14 and 15 are rotated and the switch 16 is apporpriately operated, aa desired response characteristic can be developed by the fuzzy reasoning unit.

In the description above, either one of the width and the height of membership function is corrected; however, the correction may naturally be conducted for both of the width and the height thereof.

While particular embodiments of the invention have been shown and described, it will be obvious to those skilled in the art that various changes and modifications may be made without departing from the present invention in its broader aspects.

What is claimed is:

1. An apparatus for creating membership functions for use with a fuzzy inference controller wherein said controller receives a value related to a controlled variable obtained from a control object as an input, executes a fuzzy reasoning operation in conformity with a predetermined fuzzy reasoning rule, and supplies a manipulated variable resulting from the reasoning operation to the control object, thereby achieving a fuzzy control on the control object, said apparatus for creating membership functions comprising:

membership function preset unit for setting basic membership functions;

a data input device for entering data representing a desired characteristic for a predetermined range of a value related to said controlled variable in a response characteristic of said control object; and membership function correcting means responsive to said input data for accessing the basic membership functions to select those associated with the predetermined range and for correcting the selected membership function so as to produce the desired characteristic;

wherein the value related to the controlled variable includes a position error and a velocity error.

2. An apparatus in accordance with claim 1 wherein said membership function correcting means corrects a height of particular ones of the basic membership functions.

3. An apparatus in accordance with claim 1 wherein said membership function correcting means corrects the position of particular ones of the basic membership functions.

4. An apparatus in accordance with claim 1 wherein said membership functions preset unit is a memory device storing data representing the basic membership functions.

5. A method of creating membership functions for use with a fuzzy inference controller wherein said controller receives a value related to a controlled variable obtained from a control object as an input and executes a fuzzy reasoning operation in conformity with a predetermined fuzzy reasoning rule, and supplies a manipulated variable resulted from the reasoning operation to the control object, thereby achieving a fuzzy control on the control object, the method of creating membership functions comprising the steps of:

setting basic membership functions;

receiving input data representing a desired characteristic for a predetermined range of a value related to said controlled variable in a response characteristic of said control object; and accessing in response to said input data the basic membership functions to select therefrom those associated with the predetermined range and correcting the selected membership function so as to produce the desired characteristic;

wherein the value related to the controlled variable includes a position error and a velocity error.

6. A method in accordance with claim 5 wherein for particular ones of the basic membership functions, a height thereof is corrected.

7. A method in accordance with claim 5 wherein for particular ones of the basic membership functions, a position thereof is corrected.

8. A method in accordance with claim 5 wherein setting said basic membership functions includes storing data representing the basic membership functions in a memory device.

9. An apparatus for creating membership functions for use with a fuzzy inference controller wherein said controller receives a value related to a controlled variable obtained from a control object as an input, executes a fuzzy reasoning operation in conformity with a predetermined fuzzy reasoning rule, and supplies a manipulated variable resulting from the reasoning operation to the control object, thereby achieving a fuzzy control on the control object, said apparatus for creating membership functions comprising:

membership function preset unit for setting basic membership functions;

a data input device for entering data representing a desired characteristic for a predetermined range of a value related to said controlled variable in a response characteristic of said control object; and membership function correcting means responsive to said input data for accessing the basic membership functions to select those associated with the predetermined range and for correcting the selected membership function so as to produce the desired characteristic;

wherein a width of the basic membership function is corrected by use of relationships among a position gain, a velocity gain in a PD control, a width of the membership function related to the position error and a width of the membership function related to the velocity error.

10. A method of creating membership functions for use with a fuzzy inference controller wherein said controller receives a value related to a controlled variable obtained from a control object as an input and executes a fuzzy reasoning operation in conformity with a predetermined fuzzy reasoning rule, and supplies a manipulated variable resulted from the reasoning operation to the control object, thereby achieving a fuzzy control on the control object, the method of creating membership functions comprising the steps of:

setting basic membership functions;

receiving input data representing a desired characteristic for a predetermined range of a value related to said controlled variable in a response characteristic of said control object; and accessing in response to said input data the basic membership functions to select therefrom those associated with the predetermined range and correcting the selected membership function so as to produce the desired characteristic;

wherein a width of the basic membership function is corrected by use of relationships among a position gain, a velocity gain in a PD control, a width of the membership function related to the position error and a width of the membership function related to the velocity error.

* * * * *